March 30, 1965   J. R. SIBLEY   3,175,709
CROSS EQUALIZING SUSPENSION FOR SHUTTLE CAR WHEELS
Filed Aug. 29, 1957   3 Sheets-Sheet 2

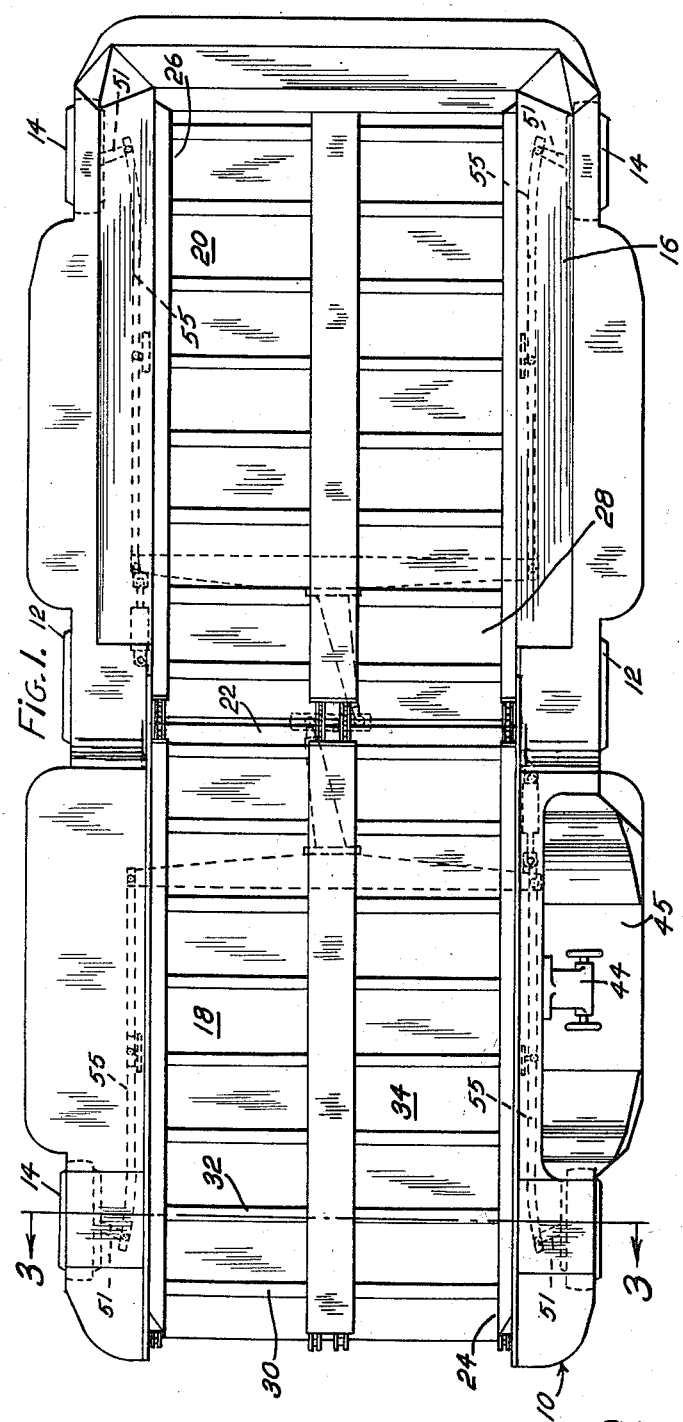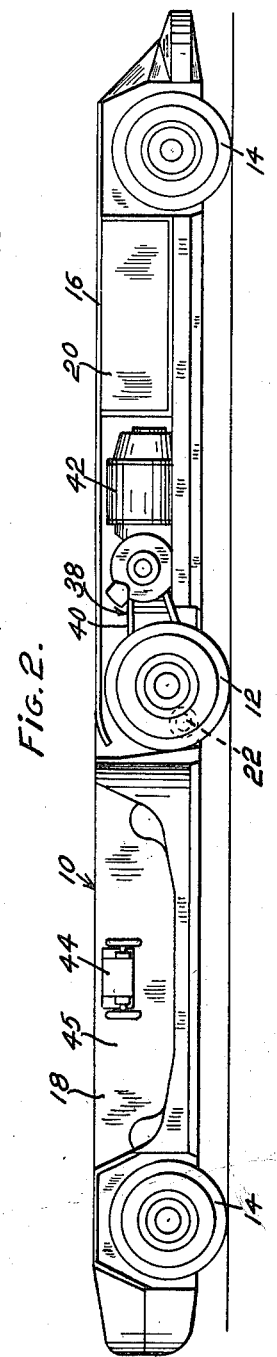

INVENTOR:
JOHN R. SIBLEY.
BY Charles F. Osgood.
ATTORNEY.

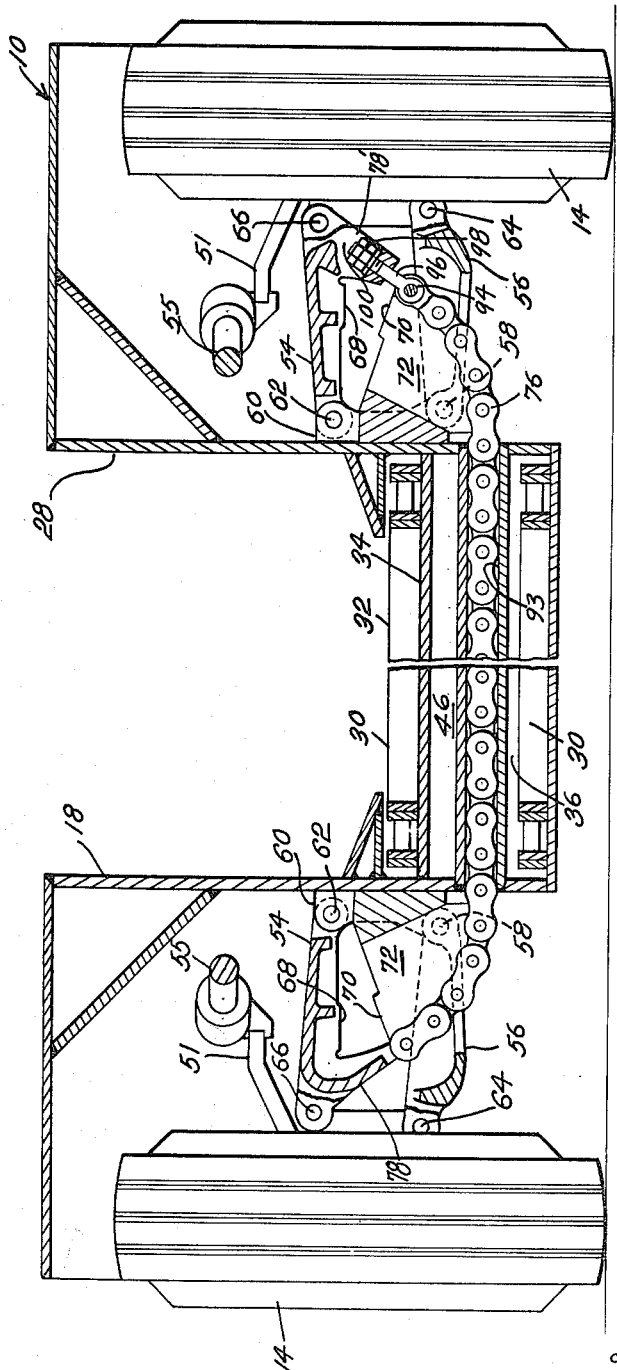
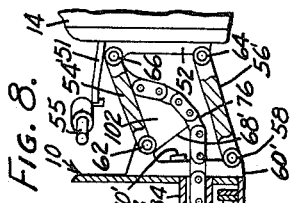
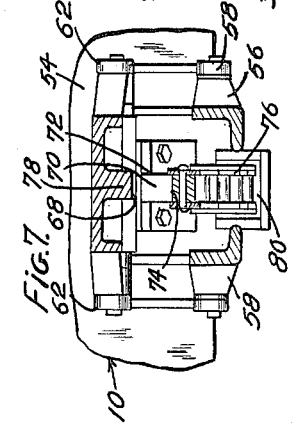
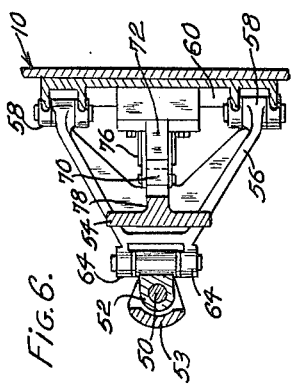

United States Patent Office 3,175,709
Patented Mar. 30, 1965

3,175,709
CROSS EQUALIZING SUSPENSION FOR
SHUTTLE CAR WHEELS
John R. Sibley, Prospect Park, Franklin, Pa., assignor to
Joy Manufacturing Company, Pittsburgh, Pa., a corporation of Pennsylvania
Filed Aug. 29, 1957, Ser. No. 681,007
14 Claims. (Cl. 214—83.36)

This invention relates to material haulage vehicles and more particularly to improvements in suspension means for low height mine haulage vehicles of the type commonly known as "shuttle cars" used for hauling loose material in underground trackless mines.

Shuttle cars frequently have to carry heavy loads through low height closely confining mine passages with rough uneven floors. If all the car supporting wheels are rigidly mounted, heavy twisting torsional stresses are imparted to the shuttle car frame, especially when a full load is being carried over rough uneven mine floors.

It is therefore the major object of the present invention to provide an improved shuttle car with load balancing suspension means extending from side to side for wheels at a car end.

Another object is to provide an improved suspension for steering wheels at a car end with a flexible chain or cable means extending from articulating parallelogram steering wheel frame mounting means, at one side of the car transversely across to similar wheel mounting means at the other side of the vehicle, and which equalizes weight of the vehicle in substantially a balanced ratio on the said steering wheels.

A further object is to provide the equivalent of a three-point suspension for shuttle cars.

Another object is to minimize, balance and distribute stresses imparted to a shuttle car by supporting wheels.

A further object is to provide an improved steering wheel suspension means which saves space to thereby provide for lower shuttle cars with more ground clearance and increased capacity.

Another object is to provide suspension means for maintaining the axis of steering wheel kingpins substantially parallel throughout the range of up and down motion of the steering wheels.

A further object is to provide improved suspension means which prevents interference between tires and the upper car body, and minimizes interference with conveyor means and/or elimination of conveyor deck structural interruptions.

A still further object is to provide improved means for adjustment of wheel height in my improved steering wheel load balancing suspension.

Further objects and advantages will appear from the following description and appended claims when read in conjunction with the attached drawings, wherein:

FIG. 1 is a top plan view showing an articulated shuttle car supported by traction driving wheels at the middle and steering wheels at each end which utilize my improved suspension means.

FIG. 2 is a side elevation of the shuttle car of FIG. 1.

FIG. 5 is an enlarged cross sectional view similar to FIG. 3 and also taken substantially along line 3—3 of FIG. 1, showing another embodiment of my improved shuttle car steering wheel suspension means.

FIG. 6 is a cross sectional view taken substantially along line 6—6 of FIG. 3, showing steering wheel parallelogram linkage mounting means detail.

FIG. 7 is a cross sectional view taken substantially along line 7—7 of FIG. 3, showing steering wheel suspension detail.

FIG. 8 is a partial enlarged cross sectional view similar to FIGS. 3 and 5 taken along line 3—3 of FIG. 1 at one side of the car showing another embodiment of my improved steering wheel suspension means.

The improved shuttle car of FIGS. 1 and 2 which utilizes my improved steering wheel suspension means at each end has been developed by Mr. John D. Russell, and is the subject matter of U.S. Patent No. 2,962,176 issued on November 29, 1960.

Although the shuttle car 10 of FIGS. 1 and 2, used to illustrate the improved suspension means, is a six-wheeler with center drive wheels 12, and with steering wheels 14 at each end of the car, it should be borne in mind that my improved suspension means could be used for steering wheels 14 at an end of a rigid frame four-wheeler shuttle car or with steering wheels of other type vehicles.

Figure 3:
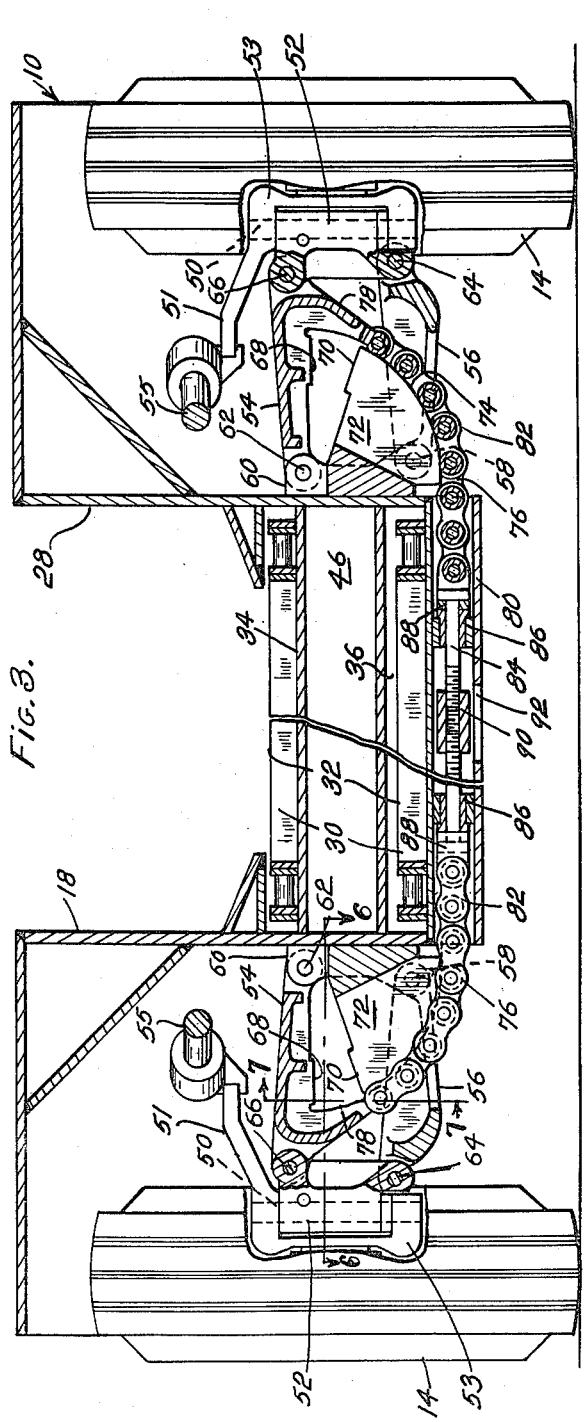
FIG. 3 is an enlarged cross sectional view taken substantially along line 3—3 of FIG. 1, showing the preferred embodment of my improved steering wheel suspension means.

The shuttle car 10 of FIGS. 1 and 2 comprises a material carrying body 16 divided into two relatively articulating body sections 18 and 20 hinged together by hinged articulating pivot means 22, as disclosed in the Russell application, extending transversely across in the center region of the car 10. Said relatively articulating body sections 18 and 20 have chambers 24 and 26 respectively which cooperate to provide a material receiving compartment, or bin 28, extending lengthwise of the vehicle. Endless conveyor means 30, with scraper flights 32, extends along the compartment bottom or deck 34. As shown in FIG. 3, the compartment bottom deck 34 is provided with a conveyor return chamber 36 in a customary manner. In lieu of the endless flight conveyor disclosed, it will be evident that various other conventional forms of conveyors may be employed.

Non-steering traction wheels 12 are rigidly mounted to the sides of body section 20 and each traction wheel 12 is provided with its own positive driving means 38, including a drive chain 40, from a respective electric drive motor 42 mounted to the respective side of the shuttle car body section 20. The shuttle car 10 is provided with steering control 44 within an operator's compartment 45. Articulating pivot means 22 permits car body sections 18 and 20 to articulate relative one to the other so that end steering wheels 14 and the traction wheels 12 conform to the mine floor.

Figure 4:
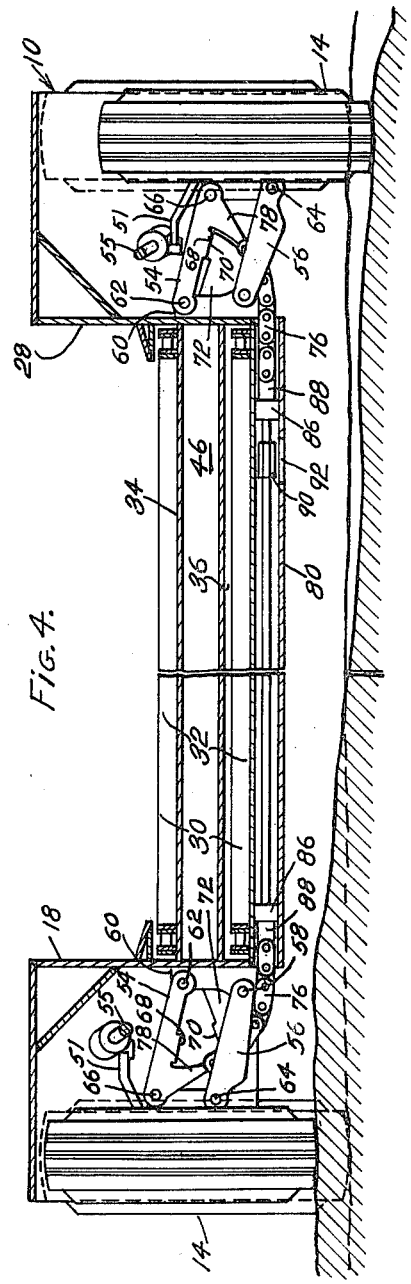
FIG. 4 is a cross sectional view also taken along line 3—3, similar to FIG. 3, showing the steering wheels and my improved suspension means of a car end articulated by an uneven mine floor.

Referring now to FIGS. 3 and 4, body sections 18 and 20 are equipped with structural body reinforcing and stiffening spacing chambers 46 between the compartment bottom, or deck 34, and the conveyor return chamber 36. Each stiffening spacing chamber 46 extends substantially the length of the respective body sections 18 and 20.

The steering wheel suspension means embodiment of FIGS. 3 and 4, within the limits of travel upwards and downwards of the steering wheels 14, equalizes vehicle weight in substantially a balancing ratio on the steering wheels 14 from side to side at the respective vehicle end. The kingpin 50 of each end steering wheel 14 is mounted in a kingpin housing 52 which is mounted for vertical up and down movement by parallelogram upper 54 and lower 56 linkage members. Steering arms 51 of respective steering wheel 14 kingpin yokes 53 are pivotally connected to respective conventional type steering linkage means 55. The lower parallelogram linkage member 56 is pivotally mounted at 58 to a frame member 60 for articulating movement in a vertical plane perpendicular to the side of the shuttle car 10. Upper parallelogram member 54 is likewise pivotally mounted at 62 to the frame member 60. Parallelogram linkage members 54 and 56 are pivotally hinged at their outer ends at the bottom 64 and at the top 66 respectively of the kingpin housing 52. Each upper parallelogram member 54 is provided with a stop contact surface 68 which comes into abutment with a stop surface 70 on a chain guide bracket 72 to limit downward travel of the respective steering wheel 14. Chain guide brackets 72, one of which is mounted on the shuttle car 10 for each steering wheel 14, have chain guiding arcuate surfaces 74. Each surface 74 guides and directs suspension chain means 76 of the roller type from its pivotal end connection with arm 78 of the upper parallelogram linkage member 54 to a suspension chain means 76 guiding chamber 80 mounted transversely across the bottom of the respective body sections 18 and 20. It should be borne in mind that flexible wire cable or rope means, not illustrated, would perhaps serve equally well in place of the suspension chain means 76 disclosed.

This provides a suspension chain means 76 which absorbs and counteracts the upward thrust transmitted to steering wheels 14, transmits this force across, and moves to maintain a dynamic balance between the two steering wheels 14 to which it is connected at the respective end of the shuttle car 10. This then, in effect, is one-point support for each end of the shuttle car 10 which gives, in turn, effectively three-point suspension (modified only as explained below) for body section 20 from this improved steering wheel 14 suspension of body section 20 and through both traction wheels 12 and, in effect, three-point suspension (modified only as explained below) for body section 18 by the steering wheel 14 suspension of the body section 18 and through the articulating pivot means 22 of the shuttle car 10 to both traction wheels 12.

This three-point suspension effect for body sections 18 and 20 is modified only by one body section tending to twist to a different degree with respect to or in the opposite direction from the other body section, when the suspension chain means 76 of one has, or both have, reached the limit of travel, one side or the other, with the tendency of one body section to twist counteracting the tendency of the other to twist through the common articulating hinge pivot means 22. Normally, the side tilt of the whole shuttle car would be determined by traction wheels 12 with suspension chain means 76 moving steering wheels 14 at each end of the car in dynamic balance for such side tilt. At this point, I might add that a four-wheeler shuttle car or other vehicle using my improved steering wheel suspension means at one end of the vehicle and rigidly mounting traction wheels at the other end has effectively three-point suspension at all times.

Suspension chain means 76 may be split into two chain subsections 82 joined together by chain load equalizing bars 84 within guiding chamber 80. Guide means 86 which guide the chain and load equalizing bars within guiding chamber 80 are provided on the shank of the connecting means 88 between the equalizing bars 84 and the respective chain sections 82. Equalizing bars 84 are adjustably connected together by capstan type internally threaded adjusting means or turnbuckle 90. Opening 92 is provided in guiding chamber 80 for access with tools to connecting and adjusting means or turnbuckle 90. Adjustment of equalizing bars 84 by capstan type internally threaded means or turnbuckle 90 is effective to raise or lower the steering wheels 14 as desired.

In the embodiment of FIG. 5, each chain guiding arcuate surface 74 guides and directs the suspension chain means 76 from its pivotal end connection with an arm 78 of the upper parallelogram linkage member 54 to a suspension chain means 76 guiding chamber 93. In this embodiment, the guiding chamber 93 is mounted transversely across the vehicle through a stiffening spacing chamber 46 between the compartment bottom or deck 34 and the conveyor return chamber 36, instead of there being a guiding chamber 80 across the bottom of a body section as in the embodiment of FIGS. 3 and 4. Suspension chain means 76 of this embodiment is a continuous chain from its pivotal end connection with one arm 78 to its pivotal end connection with the other arm 78 of respective upper parallelogram linkage members 54. The adjustable means for this embodiment is provided at one of the pivotal end connections with a modified arm 78', and comprises a pivot headed 94 stud 96, and nut means 98 positioned through arm opening 100 of the respective arm 78' and upper parallelogram linkage member 54. Adjustments of nut means 98 on stud 96 are effective to raise or lower wheels 14, as desired.

The embodiment of FIG. 8 has an arcuate guide member 102 which is an integral part of upper parallelogram linkage member 54'. Arcuate member 102, which moves with upper parallelogram linkage member 54' and with the suspension chain means 76, guides the suspension chain means 76 for alignment with suspension chain means guiding chamber 93 mounted transversely across the vehicle, as shown in the embodiment of FIG. 5. Arcuate member 102 is provided with a stop surface 68' which comes into contact with abutment 70' which is integral with frame member 60' to limit downward travel of the respective steering wheel 14 and through said suspension chain means 76 upward movement of the steering wheel 14 at the opposite side of the vehicle. This embodiment, just as with the embodiments of FIGS. 3 and 5, provides a suspension chain means 76 which absorbs and counteracts the upward thrust transmitted to steering wheels 14, transmits this force across, and moves to maintain a dynamic balance between the two steering wheels 14 to which it is connected at the respective end of the shuttle car 10. The embodiment of FIG. 8 could be so modified that arcuate member 102 would guide suspension chain means 76 for alignment with a suspension chain means guiding chamber 80 mounted transversely across the vehicle as in the embodiment of FIG. 3. Adjustment means, such as illustrated for the embodiments of FIGS. 3 and 5, could be adapted for use with respective forms of the steering wheel suspension embodiment of FIG. 8. In other possible embodiments arcuate guide member 102 would be an integral part of lower parallelogram linkage member 56' at each steering wheel 14.

I have herein provided an improved mine haulage vehicle with a load balancing suspension means extending from side to side for wheels at a car end. I use a flexible chain or cable means extending from articulating parallelogram steering wheel frame mounting means, at one side of the vehicle transversely across to similar wheel mounting means at the other side of the vehicle which is so arranged as to equalize weight of the vehicle in substantially a balanced ratio on the steering wheels. I am thereby able to provide the equivalent of a three-point suspension for shuttle cars by using rigidly mounted wheels at one end and wheels utilizing my improved suspension at the other end. I have also provided for more ground clearance and increased capacity with my improved suspension means. It is a suspension which provides for maintaining the axis of steering wheel kingpins substantially parallel throughout the range of up and down motion of the steering wheels and which prevents interference between tires and the upper car body. I have also provided a suspension with improved means for wheel height adjustment.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, a vehicle body and a suspension comprising vehicle wheels at one end of a vehicle, mounting means pivotally mounting said vehicle wheels to said vehicle body at said vehicle end for vertical movement, and flexible means extending transversely of the vehicle for connecting the said pivotal wheel mounting means at one side of the said vehicle to the said wheel mounting means at the other side of the vehicle at said end of said vehicle, guide means with a guiding arcuate surface mounted on said body at each of said vehicle wheels for guiding said flexible means connecting the said wheel mounting means, each said guide means provided with an abutment stop surface, each said wheel provided with an upper and lower parallelogram linkage member, each said upper parallelogram linkage member provided with a stop abutment surface, respective said abutment surfaces coming into abutting relationship to limit downward movement of the respective wheel and through said flexible means upward movement of the wheel at the opposite side of the vehicle.

2. In a vehicle, a vehicle body and a suspension comprising vehicle wheels at one end of a vehicle, mounting means pivotally mounting said vehicle wheels to said vehicle body at said vehicle end for vertical movement, and flexible means extending transversely of the vehicle for connecting the said pivotal wheel mounting means at one side of the said vehicle to the said wheel mounting means at the other side of the vehicle at said end of said vehicle, guide means with a guiding arcuate surface mounted on said body at each of said vehicle wheels for guiding said flexible means connecting the said wheel mounting means, the guiding arcuate surface of each said guide means guiding said flexible means to run transversely across the vehicle to the guiding arcuate surface of the said guide means for a wheel on the opposite side of said vehicle, a guiding chamber, said flexible means passing through and guided by said guiding chamber, said guiding chamber mounted transversely across the bottom of the said vehicle and extending from a guiding arcuate surface of one of said guide means to the guiding arcuate surface of another of said guide means, a wheel height adjusting means being a part of said flexible means, said adjustment means comprising a threaded member extending through a flange integral with and at the end of one of said parallelogram mounting members, said threaded member pivotally connected to one end of said flexible means and adjustable by cooperation with nut means threaded on the end thereof with said nut means abutting said flange of said parallelogram mounting member.

3. A mine haulage vehicle comprising, an elongated body having body sections connected at adjacent ends by pivot means to permit said body sections to freely pivot relative to each other about a pivot axis extending laterally of said elongated body, said elongated body having means for propelling and steering said elongated body as a unit, said steering means including at least one pair of laterally spaced wheels wherein one wheel is on one side of said body section and the other wheel is mounted on the other side of said body member, suspension means connecting said laterally spaced wheels, said suspension means being inelastic and flexible throughout its length, said body sections having cooperating chambers extending longitudinally of said body sections respectively to provide a trough shaped compartment extending substantially throughout the length of said elongated body, and an endless conveying means extending along the bottom of said compartment and guided on said body sections for movement relative thereto for loading material into the compartment and for discharging material therefrom.

4. A mine haulage vehicle comprising, an elongated mobile supported body having a pair of body parts which are connected at adjacent ends by a pivot axis for permitting said body parts to freely pivot relative to each other about said pivot axis which extends laterally of said body, said body parts having cooperating chambers extending longitudinally of said body parts respectively to provide a series of open ended trough shaped material receiving and discharging compartments, said compartments having a bottom extending substantially throughout the length of said body, said elongated body having at least a pair of steerable wheels at one end thereof, an endless conveying means extending along said compartment bottom and guided on said body parts for circulation relative thereto for loading material into the compartments and for discharging material therefrom, linkage means connecting said steerable wheels to adjacent portions of said body parts for vertical reciprocatory movement, suspension means including a rigid linearly reciprocable rod extending transversely of said elongated body operatively connecting said steerable wheels.

5. A mine haulage vehicle comprising, an elongated mobile supported body having articulated body sections connected together at adjacent ends by a pivot axis means, conveying means mounted in said body for movement thereon for loading and unloading material therefrom, said body having pairs of steerable wheels at the respective ends thereof, means connecting at least one pair of said steerable wheels for coordinated movement, and means for adjusting the effective length of said connecting means.

6. A mine haulage vehicle comprising, an elongated body having body sections connected at adjacent ends by pivot means to permit said body sections to freely pivot relative to each other about a pivot axis extending laterally of said elongated body, said elongated body having means for propelling and steering said elongated body as a unit, said steering means including pairs of laterally spaced wheels wherein one wheel is on one side of said body section and the other wheel of said pair of wheels is mounted on the other side of said body member, suspension means connecting said laterally spaced wheels, said suspension means being inelastic and flexible throughout its length, said body sections having cooperating chambers extending longitudinally of said body sections respectively to provide a trough shaped compartment extending substantially throughout the length of said elongated body, and an endless conveying means extending along the bottom of said compartment and guided on said body sections for movement relative thereto for loading material into the compartment and for discharging material therefrom, and means for adjusting the effective length of said suspension means to thereby adjust the height of the outer adjacent end of said supported body section.

7. A suspension system for a pair of laterally spaced wheels, a trough shaped body member located between said spaced wheels having a bottom portion and respective side portions, parallelogram linkage mounting means operatively connecting said wheels to adjacent side portions respectively for constraining the movement of each of said wheels for movement in a plane of rotation of said wheels vertically at all times, a chain member guided by said body member for operatively interconnecting said mounting means of said laterally spaced wheels for dependent movement, means adjusting the effective length of said chain member to thereby adjust the position of said wheels relative to said body member.

8. A suspension means for a mine haulage vehicle having an elongated mobile supported body with laterally spaced sides, said body having at least a pair of laterally spaced wheels wherein one of said wheels is located on one of said body sides and the other of said wheels is located on the other of said sides, each of said wheels having mounting means for connecting said respective wheels to adjacent portions of said sides for maintaining the respective plane of rotation of said wheels vertically at all times, said mounting means constraining the movement of said respective wheels in said vertical planes, means connecting said respective mounting means for transferring the movement of one of said wheels to the other of said wheels in equal amounts and in opposite directions.

9. Cross suspension means for a vehicle having a body with a bottom portion and side portions, ground engaging supporting wheels arranged directly opposite to each other at said side portions of said vehicle body, a movable axle mounting at each side portion of said body connecting said body to said respective adjacent wheels for limited vertical movement relative thereto, and a longitudinally shiftable cross connection extending transversely along said bottom portion and guided for movement relative to said body for connecting said axle mounting at one side of said body with said axle mounting at the other side thereof, said cross connection shifting bodily back and forth across said body as said vehicle wheels travel over a rough or uneven terrain without having any substantial change in length of said cross connection.

10. A cross suspension means as set forth in claim 9 wherein each of said axle mounting for said wheels comprises parallel motion linkage means for maintaining said body and said wheels in parallel vertical displacement.

11. A mine haulage vehicle comprising, an elongated mobile supported body having articulated body sections connected together at adjacent ends by a pivot axis means, conveying means mounted in said body for movement thereon for loading and unloading material therefrom, said body having at least a pair of steerable wheels at one end thereof for steering said body, reciprocable means operatively connecting said steerable wheels for coordinated movement in equal amounts and in opposite directions.

12. A mobile vehicle comprising, an elongated body with laterally spaced sides, a plurality of rotatable wheels for supporting said body with at least two of said wheels being located adjacent said sides respectively, respective mounting means consisting of freely pivotable interconnected rigid members connecting said two wheels to said sides for limiting the movement of said two wheels other than rotative in substantially vertical directions with respect to said body, and bodily reciprocable means consisting of an unyieldable connection between said respective mounting means to ensure that said limited movement be in opposite directions.

13. A mobile vehicle comprising, an elongated body with laterally spaced sides, a plurality of rotatable wheels for supporting said body with at least two of said wheels being located adjacent said sides respectively, respective mounting means consisting of freely pivotable interconnected rigid members connecting said two wheels to said sides for limiting the movement of said two wheels other than rotative in substantially vertical directions with respect to said body, and bodily reciprocable means consisting of an elongated transversely flexible and longitudinally unyieldable connection between said respective mounting means to ensure that said limited movement be in opposite directions.

14. A mobile vehicle comprising, an elongated body with laterally spaced sides, a plurality of rotatable wheels for supporting said body with at least two of said wheels being located adjacent said sides respectively, respective mounting means consisting of freely pivotable interconnected rigid members connecting said two wheels to said sides for limiting the movement of said two wheels other than rotative in substantially vertical directions with respect to said body, and bodily reciprocable means consisting of an unyieldable connection between said respective mounting means to ensure that said limited movement be in opposite directions, and said bodily reciprocable means being adjustable in length to vary the vertical location of said wheels relative to said body.

References Cited in the file of this patent

UNITED STATES PATENTS

| | | |
|---|---|---|
| 910,491 | Bonnevie | Jan. 26, 1909 |
| 1,427,240 | Stanfield | Aug. 29, 1922 |
| 1,631,103 | Martin | May 31, 1927 |
| 2,414,286 | Bolze | Jan. 14, 1947 |
| 2,448,224 | Low | Aug. 31, 1948 |
| 2,536,769 | Rix et al. | Jan. 2, 1951 |
| 2,602,518 | Beck | July 8, 1952 |
| 2,705,647 | Beck | Apr. 5, 1955 |
| 2,770,377 | McCallum | Nov. 13, 1956 |
| 2,962,176 | Russell | Nov. 29, 1960 |

FOREIGN PATENTS

| | | |
|---|---|---|
| 961,597 | France | Nov. 21, 1949 |
| 1,038,425 | France | May 6, 1953 |
| 756,117 | Germany | Jan. 18, 1954 |